US006256152B1

(12) United States Patent
Coldrey et al.

(10) Patent No.: US 6,256,152 B1
(45) Date of Patent: Jul. 3, 2001

(54) LAMINATE WAFERS

(75) Inventors: Peter Wallace Coldrey, Flaxley; Matthew John Cuthbertson, Somerton Park; Helena Kloubek, Morphett Vale, all of (AU); Paul John Coates, Corte Madera, CA (US)

(73) Assignee: Sola International Holdings Ltd., Lonsdale (AU)

( * ) Notice: Subject to any disclaimer, the term of this patent is extended or adjusted under 35 U.S.C. 154(b) by 0 days.

(21) Appl. No.: 09/091,338

(22) PCT Filed: Dec. 16, 1996

(86) PCT No.: PCT/AU96/00805

§ 371 Date: Jan. 11, 1999

§ 102(e) Date: Jan. 11, 1999

(87) PCT Pub. No.: WO97/22894

PCT Pub. Date: Jun. 26, 1997

(30) Foreign Application Priority Data

Dec. 18, 1995 (AU) .................................................. PN 7181

(51) Int. Cl.$^7$ .............................. G02B 3/00; G02B 5/30; F21V 9/04; G02C 7/02; G02C 7/06

(52) U.S. Cl. ..................... 359/642; 359/493; 359/359; 351/177; 351/172

(58) Field of Search ..................... 359/642, 493, 359/342, 359; 351/166, 177, 162, 172

(56) References Cited

U.S. PATENT DOCUMENTS

| 4,403,026 | * | 9/1983 | Shimizu | ................................. | 430/65 |
| 4,758,448 | | 7/1988 | Sandvig et al. . | | |
| 4,793,703 | * | 12/1988 | Fretz | ..................................... | 351/163 |
| 4,889,413 | * | 12/1989 | Ormsby | ................................. | 350/354 |
| 5,883,169 | * | 3/1999 | Spector | ................................. | 524/292 |

FOREIGN PATENT DOCUMENTS

| 54934/73 | 10/1974 | (AU) . |
| 28396/92 | 5/1993 | (AU) . |
| 51390/93 | 5/1994 | (AU) . |
| 67066/94 | 11/1994 | (AU) . |
| 78350/94 | 4/1995 | (AU) . |
| 77045/94 | 5/1995 | (AU) . |
| 0028974 | 5/1981 | (EP) . |
| 0299509 | 1/1989 | (EP) . |
| 302216A1 | 2/1989 | (EP) . |
| 0356204 | 2/1990 | (EP) . |
| 0477658 | 4/1992 | (EP) . |
| 0509190 | 10/1992 | (EP) . |
| 0552498 | 7/1993 | (EP) . |
| 2048776 | 12/1980 | (GB) . |
| 9423928A | 10/1994 | (WO) . |
| 9508133A | 3/1995 | (WO) . |
| 9509726A | 4/1995 | (WO) . |
| 96/27496 | 9/1996 | (WO) . |

OTHER PUBLICATIONS

Derwent Abstract Accession No. 96–492939/49, Class 32, JP, 82–52829, Oct. 1, 1996.
Patent Abstracts of Japan, JP, 7–174905, Jul. 14, 1995.
Derwent Abstract Accession No. 88–363083/51, Class A89 (A28, A32) JP, 63–270123, Nov. 8, 1988.
Patent Abstracts of Japan, JP 7–175131, Jul. 14, 1995.
Derwent Abstract accession No. 90–197475/26, Class P81 JP, 02–130519A, May 18, 1990.

\* cited by examiner

*Primary Examiner*—Georgia Epps
*Assistant Examiner*—Michael A. Lucas
(74) *Attorney, Agent, or Firm*—Burns, Doane, Swecker & Mathis, L.L.P.

(57) ABSTRACT

A laminate optical article including a first outer layer; a second outer layer; and an inner layer positioned between said first and second outer layers, the inner layer providing a desirable optical property to the laminate optical article.

73 Claims, No Drawings

LAMINATE WAFERS

The present invention relates to the manufacture of plastic optical articles such as sunglass lenses, ophthalmic lenses and the like. In particular, the present invention relates to the manufacture of laminate optical articles.

It is known in the prior art that in the manufacture of optical articles it is often desirable to provide additional properties to the articles, for example polarisation, UV inhibition, photochromism, electrochromism, or colouration of lenses.

Such properties are normally provided by the addition of a coating or surface treatment to the finished lens. However, such treatments are difficult and expensive to apply, and may be removed from the optical surface by scratching, wearing or the like.

Further, for example, it is known in the prior art to incorporate photochromic dyes into a plastic lens via surface imbibation techniques. See for example U.S. Pat. No. 5,130,353, or U.S. Pat. No. 5,185,390, which describe the inclusion of photochromic dyes into the subsurface region of a plastic lens by first positioning a polymeric or other carrier or photochromic dye physically against the surface of the lens and then using heat to cause the dyes to diffuse into the lens. Such techniques are both difficult and expensive, and require careful control of the depth of absorption in order to achieve a constant colour for the lens.

Further, it has been proposed in the prior art, e.g. in Japanese Patent 1259591 (1984) and Japanese Patent application 5181016 (1993), to introduce a film having desirable properties by placing a foil into a mould and cast polymerising a lens. Numerous problems have been associated with this art, however, including the formation of bubbles, haze and visible stress birefringence in the finished lens.

It would therefore be a significant advance in the art to provide a process for improving optical properties which was easy to handle and produced a product of enhanced durability.

It is accordingly an object of the present invention to overcome, or at least alleviate, one or more of the difficulties or deficiencies related to the prior art.

Accordingly, in a first aspect of the present invention there is provided a laminate optical article including
- a first outer layer;
- a second outer layer; and
- an inner layer positioned between said first and second outer layers, the inner layer providing a desirable optical property to the laminate optical article.

The laminate optical article may be characterised by improved durability and ease of handling. The laminate structure provides a product the components of which are of relatively simple geometry and are thus easy to manufacture.

The first outer layer may form a front or back wafer of a laminate optical lens. The first outer layer may include an optical surface and an interface or mating surface. The optical surface may have different optical powers along different meridians. Alternatively the optical surface may include an aspheric bi-focal, tri-focal or progressive multi-focal region or regions.

The first outer layer may be formed from any suitable material. A mineral glass or optical polymeric material may be used. The polymeric material may be of any suitable type. The polymeric material may include a thermoplastic or thermoset material. A material of the polycarbonate type, may be used. The laminate optical article is particularly suitable in polycarbonate applications. The laminate optical article may reduce or eliminate difficulties associated with the high stress co-efficient of birefringence associated with polycarbonates. The consequence of this is that when polycarbonate is moulded utilising conventional processes, flow lines and areas of stress are highly visible, for example when viewed through a polarising film.

Alternatively, the polymeric material may be of the diallyl glycol carbonate type, for example the product sold under the trade designation CR-39 (CR-39 is a Registered Trade Mark of PPG Industries, Inc.).

The polymeric material may be formed from cross-linkable polymeric casting compositions, for example as described in applicants U.S. Pat. No. 4,912,155, U.S. patent application Ser. No. 07/781,392, Australian Patent Applications 50581/93 and 50582/93, and European Patent Specification 453159A2, the entire disclosures of which are incorporated herein by reference.

Such cross-linkable polymeric casting compositions may include a diacrylate or dimethacrylate monomer (such as polyoxyalkylene glycol diacrylate or dimethacrylate or a bisphenol fluorene diacrylate or dimethacrylate) and a polymerisable comonomer, e.g. methacrylates, acrylates, vinyls, vinyl ethers, allyls, aromatic olefins, ethers, polythiols and the like.

For example, in Australian Patent Application 81216/87, the entire disclosure of which is incorporated herein by reference, applicant describes a cross-linkable coating composition including at least polyoxyalkylene glycol diacrylate or dimethacrylate and at least one poly functional unsaturated cross-linking agent.

Further, in Australian Patent Application 75160/91, the entire disclosure of which is incorporated herein by reference, applicant describes a polyoxyalkylene glycol diacrylate or dimethacrylate; a monomer including a recurring unit derived from at least one radical-polymerisabie bisphenol monomer capable of forming a homopolymer having a high refractive index of more than 1.55; and a urethane monomer having 2 to 6 terminal groups selected from a group comprising acrylic and methacrylic groups.

Such polymeric formulations are UV cured or cured by a combination of UV and thermal treatment. The range of optical lenses sold under the trade designations "Spectralite" by Applicants have been found to be suitable.

The polymeric material may include a photochromic dye which may, for example, be added to the monomer formulation used to produce the polymeric material.

The second outer layer of the laminate optical article may be of any suitable type. The second outer layer may form a protective coating for the inner layer described above. The protective coating may include one or more of the groups consisting of an abrasion resistant component, a water resistant component and an antistatic component. A peel-off protective layer may be used. The protective coating may be formed of a polymeric material. A vinyl polymer material may be used. A vinyl chloride/vinyl acetate copolymer is preferred. The protective coating may further include conventional components including plasticisers, anti-static agents and the like.

The laminate optical article so formed may be packaged for later lamination to, for example, a front or back lens wafer. A water-barrier resistant package may be used, Such packages may control relative humidity such that the stability of curvature of the lens wafers is retained. A package of the type described in U.S. Pat. No. 5,323,192 to applicants, the entire disclosure of which is incorporated herein by reference, may be used.

Alternatively, the second outer layer may form a complementary back or front wafer of a laminate optical lens. The second optical layer may form a complementary back or front wafer to the first outer layer. The second outer layer may be formed in a complementary though reverse manner to the first outer layer.

Accordingly, in a preferred aspect of the present invention there is provided a laminate optical article including
- a front lens wafer formed from a optical polymeric material;
- a second complementary back lens wafer formed from a optical polymeric material; and
- an inner layer positioned between said front and back wafer and having a shape complementary to a surface complementary to a surface of the front and/or back wafer, the inner layer providing a desirable optical property to the laminate optical article.

If desired, there may be a distribution of distance power and cylinder between the front and back lens wafers. Alternatively, the back lens wafer may be relatively thick, the laminate optical article forming a semi-finished lens.

The inner layer may be of any suitable type. The inner layer may include a polymeric film having desirable optical properties. The inner layer may include a foil, that is a film having structural integrity.

The inner layer may be of any suitable size and shape. The inner layer may be formed to have a shape complementary to a surface of the first outer layer and/or second outer layer. The inner layer may be moulded, cast, blown or otherwise shaped to have a complementary surface to the first outer layer and/or second outer layer.

The inner layer may be trimmed in situ or more preferably may be pre-cut to size. The edge of the inner layer may include a return flange to aid in dimensional stability and handling.

The inner layer may be formed to substantially correspond to the shape of an interface or mating surface of the first outer layer and/or second outer layer. Where the interface or mating surface is a curved surface, the inner layer may have a curvature which substantially corresponds to the curvature of the inner surface of the first and/or second outer layer. A typical curvature required would be of the order of approximately 4 to 8 dioptre.

It will be understood that in this preferred form since the interface surface(s) of the front lens wafer and/or second complementary back lens wafer can be kept relatively simple, the formation of the inner layer is also relatively simple and can be controlled within very close tolerances. This may reduce or prevent formation of bubbles and other optical distortions.

The desirable optical properties may be inherent in the nature of the polymeric film,. For example, a vinyl alcohol polymer may be used. A hydrolysed polyvinyl acetate (polyvinyl alcohol) may be used. The polyvinyl alcohol may be highly oriented to produce a polarising film or foil. The polyvinyl alcohol may be iodine impregnated. A polyvinyl acetate or polyvinyl butyrate polymer may be included. Such a polymer may include an active light polarising films. The polyvinyl alcohol film or foil may be provided, in a preferred form, in a cellulose acetate butyrate or like laminate.

Alternatively, the inner layer may include a polymeric film or foil having incorporated therein an optically active component.

The polymeric film or fail may be of any suitable optically transparent or transmissible material. The polymeric film may be selected from optically transparent acrylics, vinyls, allyls, esters and the like.

Where the inner layer exhibits UV absorbing characteristics, for example with a polarising film or foil, it is preferred to select a material which does not exhibit a sharp UV cut off. Such a UV out off may present difficulties where a UV curable adhesive is used in the lamination process. For example UV cure may be conducted around 365 nm so low transmission in this region may result in poor laminate adhesion.

Alternatively where a sharp UV cut off is required, for example in sunglass applications, a visible light curable adhesive may be used.

Similarly, the laminate optical, article may be formed from a polymeric material exhibiting a UV cutoff. Such polymeric materials are disclosed in International Patent Application PCT/AU96/00705 "Light Transmissible Article with Reduced Ultraviolet Transmission" to applicants, the entire disclosure of which is incorporated herein by reference.

Where a photochromic film is required, the polymeric film may be formed from cross-linkable polymeric casting compositions, such as a blend of polyoxyalkylene glycol diacrylate or dimethacrylate together with radical-polymerisable bisphenol monomer and a urethane monomer having 2 to 6 terminal groups selected from a group comprising acrylic or methacrylic groups. A preferred composition is a blend of polyoxyalkylene glycol dimethacrylate with urethane methacrylate.

The optically active component may be selected from one or more of the group consisting of light polarising materials, ultra-violet inhibitors, photochromic materials, electrochromic materials and other pigments or dyes.

The pigment(s) or dye(s) including photochromic dye(s) may be selected from one or more of the group consisting of anthraquinones, phthalocyanines, spiro-oxazines, chromenes, pyrans including spiro-pyrans and fulgides. The photochromic dye(s) may be incorporated into the monomer formulation used to produce the polymer of the inner layer.

Examples of preferred photochromic dyes may be selected from one or more of the group consisting of
- 1,3-dihydrospiro[2H-anthra[2,3-d]imidazole-2,1'-cyclohexane]-5,10-dione
- 1,3-dihydrospiro[2H-anthra[2,3-d]imidazole-2,1'-cyclohexane]-6,11-dione
- 1,3-dihydro-4-(phenylthio)spiro[2H-anthra'1,2-diimidazole-2,1'-cyclohexane]-6,11-dione
- 1,3-dihydrospiro[2-H-anthra[1,2-d]imidazole-2,1'-cycloheptane]-6,11-dione
- 1,3,3-trimethylspiro'indole-2,3'-[3H]naphtho[2,1-b]-1,4-oxazine]
- 2-methyl-3,3'-spiro-bi-[3H-naphtho[2,1-b]pyran](2-Me)
- 2-phenyl-3-methyl-7-methoxy-8'-nitrospiro[4H-1-benzopyran-4,3'-[3H]-naphtho][2,1-b]pyran
- Spiro[2H-1-benzopyran-2,9'-xanthene]
- 8-methoxy-1',3'-dimethylspiro(2H-1-benzopyran-2,2'-(1H)-quinoline
- 2,2'-Spiro-bi-[2H-1-benzopyran]
- 5'-amino-1',3',3'-trimethylspiro[2H-1-benzopyran-2,2'-indoline
- Ethyl-β-methyl-β-(3',3'-dimethyl-6-nitrospiro(2H-1-benzopyran-2,2'-indolin-1'-yl)-propenoate
- (1,3-propanediyl)bis[3', 3'-dimethyl-6-nitrospiro[2H-1-benzopyran-2,2'-indoline]
- 3,3'-dimethyl-6-nitrospiro[2H-1-benzopyrao-2,2'-benzoxazoline]
- 6'-methylthio-3,3'-dimethyl-8-methoxy-6-nitrospiro[2H-1-benzopyran-2,2'-benzothiozoline]

(1,2-ethanediyl)bis[8-methoxy-3-methyl-6-nitrospiro [2H-1-benzopyran-2,2'-benzothiozoline]

N-N'-bis(3,3'-dimethyl-6-nitrospiro[2H-1-benzopyran-2, 2'(3'H)-benzothioazol-6'-yl)decanediamide -α-(2,5-dimethyl-3-furyl)thylidene(Z)-ethylidenesuccinic anhydride; α-(2,5-dimethyl-3-furyl)-α', δ-dimethylfulgide 2,5-diphenyl-4-(2'-chlorophenyl)imidazole

[(2',4'-dinitrophenyl)methyl]-1H-benzimidazole

N-N-diethyl-2-phenyl-2H-phenanthro[9, 10-d]imidazol-2-amine

2-Nitro-3-aminofluorene 2-amino-4-(2'-furanyl)-6H-1,3-thiazine-6-thione 3,3-di(4-methoxyphenyl)-6-morpholino-3H-naphtho[2,1-b]pyran (Reversacol Corn Yellow)

3,3-di(4-methoxyphenyl)-3H-naphtho[2,1-b]pyran (Reversacol Tangerine)

2,2-di(4-methoxyphenyl)-5,6-dimethyl-2H-naphtho[2,1-b]pyran (Reversacol Berry Red)

1,3-dihydro-3,3-dimethyl-1-isobutyl-spiro[2H-indole-2, 3'-[3H]naphth[2,1-b][1,4]oxazine] (Reversacol Oxford Blue)

1,3-dihydro-3,3-trimethyl-1-neopentyl-6'-(4-diethylaminophenyl)spiro[2H-indole-2,3'-[3H]naphth [2,1,b]oxazine] (Reversacol Sea Green)

1,3-dihydro-3,3-dimethyl-1-isobutyl-6'-(4-diethylaminophenyl)spiro[2H-indole-2,3'-[3H]naphth [2,1-b][1,4]oxazine] (Reversacol Aqua Green)

1,3-dihydro-3,3-dimethyl-1isobutyl-6'-indolino spiro[2H-indole-2,3'-[3H]naphth[2,1-b][1,4]oxazine] (Reversacol Flat Purple)

1,3-dihydro-3,3-dimethyl-1-(2-phenylpropyl)-6'-indolino spiro[2H-indole-2,3'-[3H]naphth[2,1-b][1,4]oxazine] (Reversacol Storm Purple)

1,3-dihydro-3,3-dimethyl-1 isobutyl-6'-piperidino spiro [2H-indole-2,3'-[3H]naphth[2,1-b][1,4]oxazine] (Reversacol Plum Red)

1,3-dihydro-5-chloro-3,3-dimethyl-1isobutyl-6'-piperidino spiro[2H-indole-2,3'-[3H]naphth[2,1-b][1, 4]oxazine] (Reversacol Claret)

In a preferred aspect, one or more of the layers of the laminate optical layer may be subjected to a surface treatment to improve bondability and/or compatibility. The surface treatment may be selected from one or more of the group consisting of plasma discharge, corona discharge, glow discharge, radiation, UV radiation, flame treatment and laser, preferably excimer laser treatment.

Preferably the inner layer is subjected to a plasma or corona discharge treatment.

In a further preferred aspect the optical laminate article may include a plurality of inner layers, each providing one or more desirable optical properties to the article. A combination of a photochromic inner layer and a polarising inner layer is particularly preferred.

The laminate optical article may further include standard additional coatings to the front or back surface.

The optical, preferably front lens, surface may include an anti-reflective (AR) coating, for example of the type described in U.S. Pat. No. 5,704,692 to applicants, the entire disclosure of which is incorporated herein by reference. This is particularly suitable where the inner layer is a polarising film or foil. In conventional processing, when lens are AR coated they go through a stringent thermal regime, and this can damage the polarising foil. As the AR coating may be applied to a front and/or back lens wafer prior to assembly of the laminate article, thermal damage to the polarising film is simply avoided.

The optical, preferably front lens surface may include an abrasion resistant coating. e.g. of the type described in U.S. Pat. No. 4,954,591 to applicants, the entire disclosure of which, is incorporated herein by reference.

In a further preferred aspect of the present invention there is provided a series of laminate optical articles each member of the series including a back lens wafer formed from a optical polymeric material;

an outer layer forming a protective coating; and an inner layer positioned between said back lens wafer and outer protective layer, the inner layer providing a desirable optical property and shaped to have a curvature substantially corresponding to the interface surface of the back lens wafer.

Desirably successive members of the series may have suitable sphere and cylinder power to enable a member of the series to be used in combination with any design and power of front lens wafer to produce a finished lens within the normal tolerances for such lenses.

It is simply necessary to remove the protective coating just prior to attachment to the front lens wafer to provide a pristine and stable surface for lamination.

Alternatively, in a further preferred aspect, there is provided a laminate optical article including a front lens wafer formed from a optical polymeric material;

an outer layer forming a protective coating; and an inner layer positioned between said back lens wafer and outer protective layer, the inner layer providing a desirable optical property and shaped to have a curvature substantially corresponding to the interface surface of the front lens wafer.

The laminate optical article may further include a back lens wafer selected from a series of back lens wafers as described above.

Such back wafer series are described in U.S. Pat. No. 5,187,505, to applicants, the entire disclosure of which is incorporated herein by reference.

The front and back lens wafer may further include one or more additions conventionally used in casting compositions such as inhibitors, dyes including electrochromic and photochromic dyes, e.g. as described above, polarising agents, UV stabilisers and materials capable of modifying refractive index. Such additives may include:

UV Absorbers including

Ciba Geigy Tinuvin P -2(2'-hydroxy-5'methyl phenyl) benzotriazole

Cyanamid Cyasorb UV 531-2-hydroxy-4-n-octoxybenzophenone

Cyanamid Cyasorb UV5411-2(2-hydroxy-5-t-octylphenyl)-benzotriazole

Cyanamid UV 2098-2 hydroxy-4-(2-acryloyloxyethoxy) benzophenone

National Starch and Chemicals Permasorb MA -2 hydroxy-4-(2 hydroxy-3-methacryloxy)propoxy benzophenone Cyanamid UV24-2,2'-dihydroxy-4-methoxybenzophenone BASF UVINUL 400-2,4dihydroxy-benzophenone BASF UVINUL D-49-2,2'-dihydroxy-4,4'dimethoxy-benzophenone BASF UVINUL D-50-2,2',4,4'tetrahydroxy benzophenone BASF UVINUL D-35-ethyl-2-cyano-3,3-diphenyl acrylate BASF UVINUL N-539-2-ethexyl-2-cyano-3,3-diphenyl acrylate Ciba Geigy Tinuvin 213

Hindered amine light stabilisers (HALS), including

Ciba Geigy Tinuvin 765/292- bis (1,2,2,6,6-pentamethyl-4-piperidyl) sebacate

Ciba Geigy 770- bis (2,2,6,6-tetramethyl-4-piperidinyl) sebacate

Antioxidants including

Ciba Geigy Irganox 245- triethylene glycol-bis-3-(3-tertbutyl-4-hydroxy-5-methyl phenyl)propionate Irganox 1010-2,2-bis[[3-[3,4-bis(1,1-dimethylethyl)-4-hydroxyphenyl]-1-oxopropoxy]methyl]-1,3-propanediyl 3,5-bis(1,1-dimethyl ethyl)-4-hydroxy benzene propanoate Irganox 1076- octadecyl 3-(3',5'-di-tert-butyl(-4'-hydroxyphenyl) propionate Anticolouring agents including 9, 10 dihydro-9-oxa-10-phosphaphenanthrene-1-oxide Other monomeric additives may be present in, e.g. amounts up to 10% by weight as viscosity modifiers, and include monomers such as methacrylic acid, vinyl silanes, and other functional monomers. Other monomeric additives may be included to improve processing and/or material properties, these include:

methacrylic acid, maleic anhydride, acrylic acid adhesion promoters/modifiers such as Sartomer 9008, Sartomer 9013, Sartomer 9015 etc.

dye-enhancing, pH-adjusting monomers like Alcolac SIPOMER 2MIM a charge-reducing cationic monomer to render the material more antistatic, example Sipomer Q5-80 or Q9-75

The laminate optical article according to the present invention may be formed utilising any suitable techniques. Desirably, the laminate optical articles may be formed utilising a light curable adhesive, preferably a visible light or ultra-violet (UV) curable adhesive.

Accordingly, in a further preferred aspect there is provided a method for preparing a laminate optical article including providing a first outer layer formed from an optical polymeric material;

an inner layer formed from a polymeric film and capable of providing a desirable optical property to the final product; and a light curable adhesive;

contacting at least a portion of a surface of the first outer layer with the light curable adhesive;

contacting a surface of the inner layer with the adhesive bearing surface of the first outer layer; and curing the laminate so formed.

The light curable adhesive may be delivered to a surface of the first outer layer utilising any suitable technique. A syringe technique may be used.

The light curable adhesive may be of any suitable type. The light curable adhesive may be a visible light curable adhesive. The visible light curable adhesive may be selected from the group consisting of Dymax 469 and 492, Electro-Lite Corporation 4M12, Loctite 3321, Master Bond UV15-7 and 15X-2, and Lite-Fast Adhesive A-109 from Micro-Lite Technology.

The adhesive may contact the surface generally centrally thereof, to provide a generally even spread of adhesive when contact with the inner layer is made. The adhesive coating step may continue for a period sufficient to permit the adhesive to spread over a substantial proportion of the surface. A period of 60 to 180 seconds is preferred.

Where the first outer layer is a front lens wafer, the contacting step may include orienting the inner layer relative to any characteristic feature or function of the front lens wafer. For example, the axis of polarisation should be orthogonal to the ledge on a flat top bifocal front.

In a preferred aspect, the curing step may include subjecting the laminate to an initial cure whilst maintaining the components in contact under pressure for a time sufficient to achieve acceptable tack, and subjecting the partially cured laminate to a final cure through the front and back surface thereof.

Preferably the initial and/or final cure is a visible light or UV cure.

In a further preferred aspect, the method may further include providing a second outer layer formed from an optical polymeric material;

coating at least a portion of a surface of the second outer layer with the light curable adhesive;

contacting a surface of the inner layer with the adhesive bearing second outer layer; and curing the laminate so formed.

Where the second outer layer is a back lens wafer, the contacting step may include orienting the cylinder on the back lens wafer according to the optical prescription requested. A surface of one or more of the layers may be subjected to a surface treatment. Accordingly, in a preferred aspect of the present invention, the method may further include in a preliminary step a surface or part thereof of one or more of the layers is subjected to a surface treatment to improve bondability and/or compatibility.

The surfaces or parts of the surfaces of one or more of the layers making up the laminate may be modified to improve bondability and/or compatibility. The treatment may include physical and/or chemical modification of the surface of the polymer. These surface treatments may be selected from one or more of the group consisting of discharge treatment including plasma discharge, corona discharge, glow discharge, ionising radiation, UV radiation, flame treatment and/or excimer laser treatment. This treatment may be carried out in the presence of a suitable atmosphere, for example, oxygen, nitrogen, carbon dioxide, helium, argon and/or mixtures of these gases.

The treatment conditions and the time of treatment may be selected to suit the particular polymer type and other factors. The properties of the polymer surface may be altered by chemical means such as surface chemical grafting or by some other chemical treatment. A plasma discharge or corona discharge treatment is preferred. A low pressure air plasma treatment is particularly preferred.

The curing step may be a one step or two step process. The curing may occur after the inner layer is contacted with both the first outer layer and second outer layer. Alternatively the inner layer may be contacted with one outer layer and cured, after which the other outer layer is placed in contact with the inner layer and cured.

Accordingly in a still further preferred aspect, there is provided a method for preparing a laminate optical article including providing
- a first outer layer formed from an optical polymeric material;
- a second outer layer formed from an optical polymeric material;
- an inner layer with the adhesive bearing second outer layer; and
- a light curable adhesive;
- coating at least a portion of a surface of the inner layer and one of the first or second outer layers with light curable adhesive;

contacting the adhesive bearing surfaces;

coating at least a portion of the other surface of the inner layer and the other of the first or second outer layers;

contacting the other adhesive bearing surfaces to form a laminate;

subjecting the laminate to an initial cure whilst maintaining the components in contact under pressure for a time sufficient to achieve acceptable tasks; and subjecting the partially cured laminate to a final cure through the front and back surface thereof.

Desirably, the laminate may be reversed to complete the cure or the UV light, preferably visible or UV light may be directed from both sides of the laminate.

The present invention will now be more fully described with reference to the accompanying examples. It should be understood, however, that the description following is illustrative only and should not be taken in any way as a restriction on the generality of the invention described above.

EXAMPLES

Following is the description of the front and back lens wafer and inner layer components used in the following examples.

Front Polymeric Lens Wafer:
6.00 D interface curve
Diallyl glycol carbonate material
Hardcoat only
Back Polymeric Lens Wafer:
6.00 D interface curve
Diallyl glycol carbonate material
No coat
Inner Polarising Film Layer:
Preformed to 6.00 Base Curve
The lenses were subjected to the following tests:
Test Sample Description
All durability tests were performed on edged and surfaced plano samples, so as to ensure the most vulnerable test sample configuration.
The laminated 6.00 D base semi-finished polarising lenses were edged and surfaced as follows:
Lenses were diameter reduced (edged) from initial diameter 74 mm to final diameter 68 mm
Lenses were surfaced to 6.00 D base planos with centre thickness of 2.5 mm.
Test Method Description
A sequence of steps was followed to assess the durability of laminated optical articles, by visual examination of any signs of delamination. Lenses were assessed after:

Lamination completed
Diameter reduction by edging
Thickness reduction by surfacing
3 Hour Boil Test
72 hours Atlas Weatherometer Humidity test
3 Hour Boil Test
Lenses were immersed in boiling water and examined visually for delaminations at 15 minute, 30 minute, 1 hours, 2 hours and 3 hours intervals. Additional % transmission and $L^*, a^*, B^*$ were measured at the intervals to illustrate overall durability of the polarising films.

Atlas Weatherometer Humidity Test
Lenses are stored in Atlas Weatherometer chamber for 72 hours, with inspection for delaminations every 24 hours. The conditions inside the Weatherometer are 65° C. with 99% relative humidity. There is a two hours cycle time for increasing and decreasing temperature between 60–70° C.

Again, % transmission and colour coordinates were regularly checked as an indication of the polarising films' durability.

Example 1

A UV curable adhesive was applied to a front polymeric lens wafer. A polyvinyl alcohol-type polarising film was then placed in contact with the wafer. The film is shaped to the curve of the laminate interface, typically 6D. The film was moved so that its edges align with the laminate element and properly oriented relative to any characteristic feature or function of the front lens wafer. For example, the axis of polarisation should be orthogonal to the ledge on a flat top bifocal front. Once the foil was correctly oriented with respect to the front wafer, the cylinder on the back wafer was oriented according to the optical prescription required. Next, UV curable adhesive was placed on a back wafer placing it over the wafer element on which the polarising film has been placed. The axis was aligned and the adhesive UV cured as a standard lamination process. Once complete, the element may be reversed and given a supplementary UV treatment through the side that was shaded by the polarising film during the normal lamination operation. The lens was then edged and fitted. A lens of high quality and structural integrity was produced. No signs of delamination were observed.

Example 2

Lamination of Semi-Finished Polarising Lenses
A similar process was undertaken to that described in Example 1 above, with the following modifications.
Lamination Parts
The lamination process for semi-finished lenses consists of combining a front lens wafer with an inner polarising film layer and a semi-finished back component with adhesive in each of four interfaces.

Example 3

The procedure of Example 1 was repeated to the point where the polarising film has been adhered to the front lens wafer. (Note: Some gentle pressure on the polarising film may be needed to get good conformity between it and the interface curve of the front laminate element). The front lens wafer bearing the polarising film or foil may then be packaged and shipped to be used as a standard laminate element. A finished polarising lens may then be produced by applying a back lens element at a later time.

Example 4

The front lens wafer to which the polarising foil has been glued, as in Example 3, was subsequently coated with a peelable interface coating to protect the polarising film from physical damage. When peeled, just prior to lamination, a pristine surface is revealed, even if the external surface of the polarising film had been dirty at the time the interface coating was applied.

Example 5

Surface Treatment

The process of Example 1 was repeated except that the polarising film was subjected to a plasma treatment. The plasma treatment of polarising films was carried out in a Plasmod plasma system, manufactured by March Instruments (USA)

Following is a description of conditions used in plasma treatment.

Gas type: Air
Vacuum: 1 Torr
Power: 30–50 W
Duration: 10–60 sec

Low Pressure Plasma Treatment of Polarising Films—X-Ray Photo Electron Spectroscopy (XPS) Analysis The polarising film layers were formed of PVA based material impregnated with a chromophore. The films were exposed to low pressure air plasma for 60 seconds, and the surface of the films were analysed by XPS. General XPS survey scan indicates the types of elements present in the surface.

The following tables summarise the surface atomic concentrations obtained from general survey scans.

TABLE 1

Surface Atomic Concentrations

| Element | Before Plasma Conc (%) | After Plasma Conc (%) |
|---|---|---|
| Carbon | 70.5 | 62.5 |
| Oxygen | 29.5 | 36.4 |
| Nitrogen | 0 | 1.1 |

From the results it is obvious that oxygen concentration, as expected, has significantly increased after plasma treatment. Also, a small amount of nitrogen has been grafted onto the surface after plasma treatment.

Effect of Low Pressure Plasma Treatment on Durability of Laminated Lenses

The polarising films were exposed to low pressure air plasma for 60 seconds. The treated films were laminated into a semi-finished product following standard laminating technique. The durability of the lens was compared to lenses, where films were laminated in untreated form. A visual examination for delaminations was performed after lamination, edging, surface, 3 Hour Boil test and 72 hours Humidity test.

Lenses laminated using plasma treated or untreated films during edging and surfacing could not be distinguished. There were no delamination defects determined in any of the lens samples studied.

However, during 3 Hour Boil test and 72 Hour Humidity test, differences between lenses became obvious.

Following table 2 summarises the results.

TABLE 2

| | 3 Hour Boil Test (Polarising Film) | | | | | |
|---|---|---|---|---|---|---|
| Time | Initial | 18 Min | 30 Min | 1 Hour | 2 Hours | 3 Hours |
| POLARISING FILM - UNTREATED | | | | | | |
| Delam. | No delam. | Delam. up to 5 mm from edge | Delam. increasing up to 10 mm from edge | Delam. not increas. Film: dissolving | Film further dissolving | Film further dissolving |
| % T | 17 | 16 | 16 | 17 | 18 | 20 |
| L* | 48 | 47 | 47 | 49 | 50 | 52 |
| a* | −2.7 | −2.7 | −2.5 | −2.3 | −1.7 | −0.40 |
| b* | +0.9 | +0.9 | −0.08 | −0.05 | +0.50 | −1.20 |
| POLARISING FILM - PLASMA TREATED | | | | | | |
| Delam. | No Delam. | No Delam. | No Delam. | No Delam. | No Delam - Film slightly retracting | No Delam - Film retracted up to 1 mm |
| % T | 16 | 16 | 17 | 17 | 18 | 22 |
| L* | 48 | 48 | 48 | 49 | 50 | 54 |
| a* | −2.6 | −2.6 | −2.8 | −2.6 | −1.30 | −0.2 |
| b* | +0.8 | +0.5 | +0.02 | +0.2 | −0.3 | −2.2 |

From results in table 2, it is obvious that lenses which were laminated using untreated polarising film started to delaminate after 15 minutes in boiling water. Most of the delaminations occurred within the first hour of boiling, which was then followed by total destruction of the polarising film within the delaminated areas.

Lenses which were laminated using plasma treated film did not delaminate during the entire 3 Hours Boiling test duration. Only slight film retraction is obvious after 2 hours of boiling.

The durability of lenses was studied in 72 Hours Humidity test. Lenses were checked visually for delaminations at 24 hour intervals. Table 3 summarises the results.

TABLE 3

Atlas Weatherometer Humidity Test

| Film Type | Plasma Treatment | Initial | 24 Hours | 48 Hours | 72 Hours |
|---|---|---|---|---|---|
| Polarising film | No | No delam | Delam up to 3 mm around edges | Delam increasing up to 5 mm | Film dissolving in delam area |

TABLE 3-continued

Atlas Weatherometer Humidity Test

| Film Type | Plasma Treatment | Initial | 24 Hours | 48 Hours | 72 Hours |
|---|---|---|---|---|---|
| Polarising film | Yes | No delam | No delam | No delam | No delam |

Again, the effect of plasma treatment is clearly obvious. Lenses laminated with treated film did not exhibit any delaminations, whilst lenses which were laminated using untreated film delaminated within 24 hours.

Example 6

Comparative Polarising Lenses Durability Assessment

Laminated polarising lenses according to the present invention were compared to two prior art products, Talex (Japan) and Younger Optics (USA). The performance of the lenses was assessed using 72 hours Humidity test.

Visual assessment of delaminations were performed at 24 hour intervals, and colour coordinates were measured to examine overall durability of polarising films.

The following table summarises the overall rating given to the durability performance of compared lenses.

| Lens Type | Rating |
|---|---|
| Laminated Optical lens | 1 |
| Talex Grey | 2 |
| Talex Brown | 2 |
| Younger Optics | 10 |

1 = Best, 10 = worst

Talex product and laminated optical lenses performed well in 72 hour Humidity test. Lenses manufactured by Talex did not show any signs of delaminations, however the polarising film retracted up to 2 mm from the edge of the lenses, after 72 hours exposure. The laminated lenses according to the present invention did not show any signs of delaminations and no film retractions from the edge. Lenses manufactured by Younger Optics started delaminating after 24 hours exposure. At the end of 72 hours exposure, the lenses were almost fully delaminated with severe substrate cracking in the front portion of the lenses.

The following table 5 shows the initial and final colour coordinates of tested lenses, in an attempt to illustrate the stability of the polarising films.

TABLE 5

Effect of 72 Hour Humidity Test on Colour Stability of the Film

| | Initial | | | | Final | | | |
|---|---|---|---|---|---|---|---|---|
| Lens Type | % T | L* | a* | b* | % T | L* | a* | b* |
| Laminated Optical Lens | 17 | 49 | −2 | −2 | 17 | 49 | −1 | −2 |
| Talex Grey | 10 | 37 | +1 | −3 | 11 | 39 | +5 | −1 |

TABLE 5-continued

Effect of 72 Hour Humidity Test on Colour Stability of the Film

| | Initial | | | | Final | | | |
|---|---|---|---|---|---|---|---|---|
| Lens Type | % T | L* | a* | b* | % T | L* | a* | b* |
| Talex Brown | 29 | 61 | +3 | +19 | 33 | 64 | +5 | +20 |
| Younger Optics | 39 | 68 | −4 | +7 | 67 | 86 | −2 | +1 |

The laminated optical lens according to the present invention exhibits the best stability, following by films used in Talex product. However, film used in Younger Optics Products displayed a very poor temperature stability, graining up to 30% in transmission and completely losing colour.

Example 7 a) UV Curable Adhesive (Comparative)

The process of Example 5 was repeated except that the front lens wafer was formed either from an inherently UV absorbing polymeric material or from a polymeric material modified to exhibit UV cutoff at a preselected wavelength (e.g. 320 nm to 380 nm).

The results are provided in Table 6 below.

TABLE 6

Effect of UV absorbing substrates on cure of Dymax 492

| | % Conversion | | | | |
|---|---|---|---|---|---|
| Cure Time (min) | UV320 | UV350 | UV370 | UV380 | Polarising film |
| 0.2 | 10 | 2 | 0 | 0 | 0 |
| 0.4 | 38 | 12 | 0.2 | 0 | 0 |
| 0.6 | 59 | 26 | 0.4 | 0 | 0 |
| 0.8 | 74 | 39 | 0.7 | 0 | 0 |
| 1.0 | 83 | 49 | 1 | 0 | 0 |
| 2.0 | 92 | 79 | 7 | 0.2 | 3 |
| 5.0 | 94 | 90 | 35 | 3 | 35 |
| 10.0 | 97 | 92 | 62 | 12 | 69 |

90% conversion has to be achieved - otherwise cure inadequate

D492—conventional UV cured adhesive

Conclusion

Dymax 492 cannot cure UV absorbing substrates b) Visible light curable adhesive

The process of Example 7a was repeated except that a range of visible light curable adhesives were used.

The results are provided in Table 7 below.

TABLE 7

CR496 - Effect of UV absorbing substrates

| Cure Time (min) | UV 320 | UV 380 | Polarising | Photochromic | Polycarbonate | UV380/ Polarising | Photochromic Polarising |
|---|---|---|---|---|---|---|---|
| 0.2 | 11 | 6 | 3 | 5 | 5 | 3 | 4 |
| 0.4 | 37 | 29 | 13 | 24 | 22 | 13 | 16 |
| 0.6 | 55 | 47 | 26 | 41 | 39 | 26 | 33 |
| 0.8 | 68 | 60 | 38 | 53 | 51 | 38 | 42 |
| 1.0 | 76 | 70 | 46 | 62 | 59 | 46 | 51 |
| 2.0 | 86 | 84 | 71 | 82 | 79 | 71 | 80 |
| 5.0 | 90 | 88 | 85 | 89 | 87 | 85 | 87 |
| 10.0 | 94 | 90 | 89 | 91 | 90 | 89 | 90 |

CR496 - Proprietary SOLA visible adhesive
X279381 - commercial visible light adhesive
UV 380/polarising - means two layers
Photochromic/polarising - means two layers
Polycarbonate is inherently UV absorbing polymer
90% conversion achieved in all cases - cure adequate

TABLE 8

X-270-38-1 Effect of UV absorbing substrates

% Conversion

| Cure Time (min) | UV 320 | UV380 | Polarising Film | Photochromic | UV 380/ Polarising | Photochromic/ Polarising |
|---|---|---|---|---|---|---|
| 0.2 | 8 | 8 | 1 | 7 | 1 | 5 |
| 0.4 | 34 | 35 | 6 | 28 | 6 | 22 |
| 0.6 | 51 | 54 | 15 | 46 | 14 | 38 |
| 0.8 | 64 | 66 | 26 | 57 | 23 | 48 |
| 1.0 | 73 | 75 | 35 | 65 | 32 | 59 |
| 2.0 | 88 | 86 | 61 | 83 | 57 | 78 |
| 5.0 | 92 | 90 | 83 | 89 | 79 | 85 |
| 10.0 | 97 | 94 | 90 | 91 | 87 | 90 |

Dymax X-279-38-1 - Commercially available visible adhesive
Approximately 90% conversion achieved in all cases - cure adequate

Example 8

Laminate Lens Element Bearing Protective Coating

Laminate lens elements comprising a front polymeric lens wafer and an inner polarising film layer were coated with a protective coating comprising a vinyl chloride/vinyl acetate copolymer dissolved in acetone and subsequently dried.

After three weeks there was no visible effect of the polarising film layer on the protective coating. There was no discolouration of the films and no evidence of dye transfer from the polarising film into the protective coating.

Effect of Exposure of Laminated Semi-Finished Lenses to Acetone

The laminated lens elements comprising a front polymeric lens wafer and an inner polarising film layer were soaked in acetone for 48 hours.

As acetone is a major component of a typical protective interface coating, the soaking process is an extreme test of the ability of the laminated lens element to withstand the protective coating process. For example, in a typical process the interface coating step continues for less than approximately one minute prior to drying.

After 48 hours, there was no obvious loss of colour in the polarising film and no obvious loss of polarisation. Further the acetone had not picked up any colour from the films.

Slight penetration of acetone along the glue layer was apparent but no delamination was apparent.

Example 9

Lamination of Photochromic Lenses

A similar process was undertaken to that described in Example 1 above, with the following modifications.

The lamination process consists of laminating a front lens wafer with an inner photochromic layer and a back lens wafer with adhesive in each of four interfaces.

The inner photochromic layer comprises a cast flexible film, incorporating photochromic dyes. This film was shaped to match the interface curves on the front and back lens wafers.

The photochromic film is a polyoxyalkylene glycol dimethacrylate with urethane methacrylate including a mixture of three photochromic dyes. The photochromic dyes are selected from any of those descried above. A typical mixture comprises a Reversacol Corn Yellow, Reversacol Berry Red and Reversacol Sea Green.

The laboratory lamination was performed using a standard lamination techniques. CR496 was used as the visible light curable adhesive.

The final cure of the adhesive was achieved by exposing the front and back surface of the laminated lens for four minutes (back surface).

A lens of high quality and structural integrity, exhibiting photochromic effects, was produced.

Example 10

Lamination of Photochromic/Polarising Lenses

Example 10A

A similar process was undertaken to that described in Example 1 above, with the following modifications.

The lamination process comprised laminating a front lens wafer with an inner shaped polarising film layer in the manner described in Example 1 above. The inner shaped polarising film layer was formed from a PVA material impregnated from a chromophore.

An inner photochromic layer as described in Example 9 above was laminated to the polarising film coated front lens wafer and a back lens wafer with adhesive in each of the four interfaces.

The laboratory lamination was performed using a standard lamination techniques. CR496 was used as the visible light curable adhesive.

The final cure of the adhesive was achieved by exposing the front and back surface of the laminated lens for four minutes (back surface).

Example 10B

The process of Example 10A was repeated but the order of shaped polarising film layer and inner photochromic layer reversed.

In both examples, a lens of high optical quality and structural integrity, exhibiting a combination of photochromic and polarisation effects, was produced.

Finally, it is to be understood that various other modifications and/or alterations may be made without departing from the spirit of the present invention as outlined herein.

What is claimed is:

1. A laminate optical article including a first outer layer, a second layer and at least one inner layer positioned between the first and second out layers, at least one inner layer including a photochromic material therein wherein a surface or part thereof of one or more of the layers is subjected to a surface treatment to improve bondability and/or compatibility, the surface treatment being selected from one or more of the group consisting of plasma discharge, corona discharge, glow discharge, ionizing radiation, UV radiation, flame treatment, and laser treatment.

2. A laminate optical article according to claim 1, wherein the first outer layer forms a front or back wafer of an optical lens and includes an optical surface and an interface or mating surface.

3. A laminate optical article according to claim 2, wherein the first outer layer is formed from a glass or optical polymeric material.

4. A laminate optical article according to claim 3, wherein the first outer layer is formed from a polycarbonate material.

5. A laminate optical article according to claim 2, wherein the second outer layer forms a complementary back or front wafer of a laminate optical.

6. A laminate optical article according to claim 5, wherein the second outer layer is formed from a glass or optical polymeric material.

7. A laminate optical article according to claim 6, wherein the second outer layer is formed from a polycarbonate material.

8. A laminate optical article according to claim 2, wherein an optical surface thereof includes an anti-reflective (AR) coating and/or abrasion resistant coating thereon.

9. A laminate optical article according to claim 1, wherein the second outer layer forms a protective coating for the inner layer.

10. A laminate optical article according to claim 9, wherein the protective coating includes one or more of the group consisting of an abrasion resistant component, a water resistant component and an antistatic component.

11. A laminate optical article according to claim 1, wherein the inner layer includes a polymeric film or foil having the photochromic material therein.

12. A laminate optical article according to claim 11, wherein the inner layer has a shape complementary to a surface of the first and/or second outer layers.

13. A laminate optical article according to claim 12, wherein the inner layer has a curvature which substantially corresponds to the curvature of the inner surface of the first and/or second outer layer.

14. A laminate optical article according to claim 11, wherein the polymeric film or foil includes an active light polarising film.

15. A laminate optical article according to claim 1, wherein the inner layer includes a photochromic dye(s) selected from one or more of the group consisting of anthraquinones, phthalocyanines, spiro-oxazines, chromenes, pyrans including spiro-pyrans, and fulgides.

16. A laminate optical article according to claim 1, including a plurality of inner layers each providing at least one of (i) polarization property, (ii) photochromicity property, or (iii) color property to the laminate optical article.

17. A laminate optical article according to claim 16, including an inner polarising film layer and an inner photochromic layer.

18. A laminate optical article according to claim 1, wherein the inner layer is subjected to a plasma or corona discharge treatment.

19. A laminate optical article including
   a first front lens wafer formed from an optical polymeric material;
   a second complementary back lens wafer formed from an optical polymeric material; and
   an inner layer positioned between said front and back lens wafer and having a shape complementary to a surface of the front and/or back wafer, the inner layer including a photochromic material therein wherein a surface or part thereof of at least one of the first front lens wafer, second complementary back lens wafer, or inner layer is subjected to a surface treatment to improve bondability and/or compatibility, the surface treatment being selected from one or more of the group consisting of plasma discharge, corona discharge, glow discharge, ionizing radiation, UV radiation, flame treatment, and laser treatment.

20. A series of laminate optical articles, each member of the series including
   a back lens wafer formed from an optical polymeric material;
   an outer layer forming a protective coating; and
   an inner layer positioned between said back lens wafer and outer protective layer, the inner layer including a photochromic material therein and being shaped to have a curvature substantially corresponding to the interface surface of the back lens wafer wherein a surface or part thereof of at least one of the back lens wafer, outer layer, or inner layer is subjected to a surface treatment to improve bondability and/or compatibility, the surface treatment being selected from one or more of the group consisting of plasma discharge, corona discharge, glow discharge, ionizing radiation, UV radiation, flame treatment, and laser treatment.

21. A laminate optical article series according to claim 20, wherein the protective coating is formed from a vinyl chloride/vinyl acetate copolymer.

22. A laminate optical article including
a front lens wafer formed from an optical polymeric material;
an outer layer forming a protective coating; and
an inner layer positioned between said front lens wafer and outer protective layer, the inner layer including a photochromic material therein and being shaped to have a curvature substantially corresponding to the interface surface of the front lens wafer wherein a surface or part thereof of at least one of the front lens wafer, outer layer, or inner layer is subjected to a surface treatment to improve bondability and/or compatibility, the surface treatment being selected from one or more of the group consisting of plasma discharge, corona discharge, glow discharge, ionizing radiation, UV radiation, flame treatment, and laser treatment.

23. A laminate optical article according to claim 22, wherein the protective coating is formed from a vinyl chloride/vinyl acetate copolymer.

24. A laminate optical article according to claim 22, further including a complementary back lens wafer formed from an optical polymeric material.

25. A method for preparing a laminate optical article including:
providing a first outer layer formed from an optical polymeric material;
an inner layer formed from a polymeric film wherein a surface or part thereof of the inner layer is subjected to a surface treatment to improve bondability and/or compatibility, the surface treatment being selected from one or more of the group consisting of plasma discharge, corona discharge, glow discharge, ionizing radiation, UV radiation, flame treatment, and laser treatment; and
a light curable adhesive;
coating at least a portion of a surface of the first outer layer with the light curable adhesive;
contacting a surface of the inner layer with the adhesive bearing surface of the first outer layer; and
curing the laminate so formed, wherein the inner layer includes a photochromic material therein.

26. A method according to claim 25, wherein the light curable adhesive is delivered to a surface of the first outer layer generally centrally thereof, utilising a syringe technique, to provide a generally even spread of adhesive when contact with the inner layer is made.

27. A method according to claim 26, wherein the adhesive coating step continues for a period sufficient to permit the adhesive to spread over a substantial proportion of the surface.

28. A method according to claim 25, wherein the curing step includes:
subjecting the laminate to an initial cure whilst maintaining the components in contact under pressure for a time sufficient to achieve acceptable tack; and
subjecting the partially cured laminate to a final cure through the front and back surface thereof.

29. A method according to claim 28, wherein the initial and/or final cure is a visible light or UV cure.

30. A method according to claim 25, further including
providing a second outer layer formed from an optical polymeric material;
coating at least a portion of a surface of the second outer layer with the light curable adhesive;
contacting a surface of the inner layer with the adhesive bearing second outer layer; and
curing the laminate so formed.

31. A method according to claim 25, wherein the inner layer is subjected to a plasma or corona discharge treatment.

32. A method for preparing a laminate optical article including:
providing a first outer layer formed from an optical polymeric material, a second outer layer formed from an optical polymeric material, an inner layer, and a light curable adhesive;
coating at least a portion of a surface of the inner layer and one of the first or second outer layers with light curable adhesive;
contacting the adhesive bearing surfaces;
coating at least a portion of the other surface of the inner layer of the other of the first or second outer layers with light curable adhesive;
contacting the other adhesive bearing surfaces to form a laminate subjecting the laminate to an initial cure whilst maintaining the components in contact under pressure for a time sufficient to achieve acceptable tack; and
subjecting the partially cured laminate to a final cure through the front and back surface thereof, wherein the inner layer comprises a polymeric film or foil that includes a photochromic material therein.

33. A laminate optical article including a first outer layer, a second outer layer, and at least one inner layer positioned between the first and second outer layers, wherein the first outer layer, the second outer layer and at least one inner layer have a light curable adhesive therebetween, and wherein the at least one inner layer provides at least one of (i) polarization property, (ii) photochromicity property, or (iii) color property to the laminate optical article and the inner layer comprises a polymeric film or foil.

34. A laminate optical article according to claim 33, wherein the first outer layer forms a front or back wafer of an optical lens and includes an optical surface and an interface or mating surface.

35. A laminate optical article according to claim 34, wherein the first outer layer is formed from a glass or optical polymeric material.

36. A laminate optical article according to claim 35, wherein the first outer layer is formed from a polycarbonate material.

37. A laminate optical article according to claim 34, wherein the second outer layer forms a complementary back or front wafer of a laminate optical.

38. A laminate optical article according to claim 37, wherein the second outer layer is formed from a glass or optical polymeric material.

39. A laminate optical article according to claim 38, wherein the second outer layer is formed from a polycarbonate material.

40. A laminate optical article according to claim 34 wherein an optical surface thereof includes an anti-reflective (AR) coating and/or abrasion resistant coating thereon.

41. A laminate optical article according to claim 33, wherein the second outer layer forms a protective coating for the inner layer.

42. A laminate optical article according to claim 41, wherein the protective coating includes one or more of the group consisting of an abrasion resistant component, a water resistant component and an antistatic component.

43. A laminate optical article according to claim 33, wherein the inner layer has a shape complementary to a surface of the first and/or second outer layers.

44. A laminate optical article according to claim 43, wherein the inner layer has a curvature which substantially corresponds to the curvature of the inner surface of the first and/or second outer layer.

45. A laminate optical article according to claim 33, wherein the polymeric film or foil includes an active light polarising film.

46. A laminate optical article according to claim 33, wherein the polymeric film or foil has incorporated therein an optically active component selected from the group consisting of one or more of the group consisting of light polarising materials, ultra-violet inhibitors, photochromic materials, electrochromic materials and other pigments or dyes.

47. A laminate optical article according to claim 46, wherein the inner layer includes a photochromic dye(s) selected from one or more of the group consisting of anthraquinones, phthalocyanines, spiro-oxazines, chromenes, pyrans including spiro-pyrans, and fulgides.

48. A laminate optical article according to claim 33, including a plurality of inner layers each providing one or more desirable optical properties to the laminate optical article.

49. A laminate optical article according to claim 48, including an inner polarising film layer and an inner photochromic layer.

50. A laminate optical article according to claim 33, wherein a surface or part thereof of one or more of the layers is subjected to a surface treatment to improve bondability and/or compatibility.

51. A laminate optical article according to claim 50, wherein the surface treatment is selected from one or more of the group consisting of plasma discharge, corona discharge, glow discharge, ionising radiation, UV radiation, flame treatment and laser treatment.

52. A laminate optical article according to claim 51, wherein the inner layer is subjected to a plasma or corona discharge treatment.

53. A laminate optical article including
a first front lens wafer formed from an optical polymeric material;
a second complementary back lens wafer formed from an optical polymeric material; and
an inner layer positioned between said front and back lens wafer and having a shape complementary to a surface of the front and/or back wafer, wherein the inner layer comprises a polymeric film or foil that provides at least one of (i) polarization property, (ii) photochromicity property, or (iii) color property to the laminate optical article, and wherein the back wafer and inner layer have a light curable adhesive therebetween.

54. A series of laminate optical articles, each member of the series including
a back lens wafer formed from an optical polymeric material;
an outer layer forming a protective coating; and
an inner layer positioned between said back lens wafer and outer protective layer, wherein the inner layer comprises a polymeric film or foil that provides at least one of (i) polarization property, (ii) photochromicity property, or (iii) color property to each member and the inner layer is shaped to have a curvature substantially corresponding to the interface surface of the back lens wafer, wherein the layers have a light curable adhesive therebetween.

55. A laminate optical article series according to claim 54, wherein the protective coating is formed from a vinyl chloride/vinyl acetate copolymer.

56. A series of laminate optical articles, each member of the series including
a back lens wafer formed from an optical polymeric material;
an outer layer forming a protective coating; and
an inner layer positioned between said back lens wafer and outer protective layer, wherein the inner layer provides at least one of (i) polarization property, (ii) photochromicity property, or (iii) color property to each member and the inner layer is shaped to have a curvature substantially corresponding to the interface surface of the back lens wafer, wherein the layers have a light curable adhesive therebetween wherein successive members of the series have suitable sphere and cylinder power to enable a member of the series to be used in combination with any design and power of front lens wafer to produce a finished lens within the normal tolerances for such lenses.

57. A laminate optical article including
a front lens wafer formed from an optical polymeric material;
an outer layer forming a protective coating; and
an inner layer positioned between said back lens wafer and outer protective layer, wherein the inner layer comprises a polymeric film or foil that provides at least one of (i) polarization property, (ii) photochromicity property, or (iii) color property to the laminate optical article and the inner layer is shaped to have a curvature substantially corresponding to the interface surface of the front lens wafer, wherein the layers have a light curable adhesive therebetween.

58. A laminate optical article according to claim 57, wherein the protective coating is formed from a vinyl chloride/vinyl acetate copolymer.

59. A laminate optical article according to claim 57, that further includes a back lens wafer.

60. A method for preparing a laminate optical article including:
providing a first outer layer formed from an optical polymeric material,
an inner layer formed from a polymeric film that provides at least one of (i) polarization property, (ii) photochromicity property, or (iii) color property to the final product wherein a surface or part thereof of the inner layer is subjected to a surface treatment to improve bondability and/or compatibility, the surface treatment being selected from one or more of the group consisting of plasma discharge, corona discharge, glow discharge, ionizing radiation, UV radiation, flame treatment, and laser treatment, and a light curable adhesive;
coating at least a portion of a surface of the first outer layer with the light curable adhesive;
contacting a surface of the inner layer with the adhesive bearing surface of the first outer layer; and
curing the laminate so formed.

61. A method according to claim 60, wherein the light curable adhesive is delivered to a surface of the first outer layer generally centrally thereof, utilising a syringe technique, to provide a generally even spread of adhesive when contact with the inner layer is made.

62. A method according to claim 61, wherein the adhesive coating step continues for a period sufficient to permit the adhesive to spread over a substantial proportion of the surface.

63. A method according to claim 60, wherein the curing step includes:
subjecting the laminate to an initial cure whilst maintaining the components in contact under pressure for a time sufficient to achieve acceptable tack; and
subjecting the partially cured laminate to a final cure through the front and back surface thereof.

64. A method according to claim 63, wherein the initial and/or final cure is a visible light or UV cure.

65. A method according to claim 60, further including
providing a second outer layer formed from an optical polymeric material;
coating at least a portion of a surface of the second outer layer with the light curable adhesive;
contacting a surface of the inner layer with the adhesive bearing second outer layer; and
curing the laminate so formed.

66. A method for preparing a laminate optical article including:
providing a first outer layer formed from an optical polymeric material, a second outer layer formed from an optical polymeric material, an inner layer, and a light curable adhesive;
coating at least a portion of a surface of the inner layer and one of the first or second outer layers with light curable adhesive;
contacting the adhesive bearing surfaces;
coating at least a portion of the other surface of the inner layer and the other of the first or second outer layers with light curable adhesive;
contacting the other adhesive bearing surfaces to form a laminate subjecting the laminate to an initial cure whilst maintaining the components in contact under pressure for a time sufficient to achieve acceptable tack; and
subjecting the partially cured laminate to a final cure through the front and back surface thereof, wherein in a preliminary step, a surface or part thereof of one or more of the layers is subjected to a surface treatment to improve bondability and/or compatibility, the surface treatment being either a plasma discharge treatment or a corona discharge treatment.

67. A method for preparing a laminate optical article including:
providing a first outer layer formed from an optical polymeric material;
an inner layer formed from a polymeric film wherein a surface or part thereof of the inner layer is subjected to a surface treatment to improve bondability and/or compatibility, the surface treatment being selected from one or more of the group consisting of plasma discharge, corona discharge, glow discharge, ionizing radiation, UV radiation, flame treatment, and laser treatment; and
a light curable adhesive;
coating at least a portion of a surface of the first outer layer with the light curable adhesive;
contacting a surface of the inner layer with the adhesive bearing surface of the first outer layer; and
curing the laminate so formed, wherein the inner layer includes a light polarizing material therein.

68. A method according to claim 67, wherein the light curable adhesive is delivered to a surface of the first outer layer generally centrally thereof, utilizing a syringe technique, to provide a generally even spread of adhesive when contact with the inner layer is made.

69. A method according to claim 68, wherein the adhesive coating step continues for a period sufficient to permit the adhesive to spread over a substantial proportion of the surface.

70. A method according to claim 67 wherein the curing step includes:
subjecting the laminate to an initial cure while maintaining the components in contact under pressure for a time sufficient to achieve acceptable tack; and
subjecting the partially cured laminate to a final cure through the front and back surface thereof.

71. A method according to claim 70 wherein the initial and/or final cure is a visible light or UV cure.

72. A method according to claim 67, further including
providing a second outer layer formed from an optical polymeric material;
coating at least a portion of a surface of the second outer layer with the light curable adhesive;
contacting a surface of the inner layer with the adhesive bearing second outer layer; and
curing the laminate so formed.

73. A method according to claim 67 wherein the inner layer is subjected to a plasma or corona discharge treatment.

* * * * *